United States Patent
Kuo

(10) Patent No.: US 9,260,159 B2
(45) Date of Patent: *Feb. 16, 2016

(54) TWO-WHEEL VEHICLE STRUCTURE

(71) Applicant: Cheng Ho Chen, Taichung (TW)

(72) Inventor: Chih Tsung Kuo, New Taipei (TW)

(73) Assignee: Cheng Ho Chen, Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,801

(22) Filed: Oct. 14, 2014

(65) Prior Publication Data

US 2015/0102579 A1  Apr. 16, 2015

(30) Foreign Application Priority Data

Oct. 14, 2013 (TW) .............................. 102137031 A

(51) Int. Cl.
| | |
|---|---|
| *B62M 11/04* | (2006.01) |
| *B62M 11/18* | (2006.01) |
| *B62M 11/14* | (2006.01) |
| *F16H 3/66* | (2006.01) |
| *B62M 11/10* | (2006.01) |

(52) U.S. Cl.
CPC ............... *B62M 11/18* (2013.01); *B62M 11/10* (2013.01); *B62M 11/145* (2013.01); *F16H 3/663* (2013.01)

(58) Field of Classification Search
CPC .... B62M 11/145; B62M 11/04; B62M 11/18; F16H 3/663
USPC ........................................................ 280/236
See application file for complete search history.

(56) References Cited

U.S. PATENT DOCUMENTS

| | | | | | |
|---|---|---|---|---|---|
| 2,553,465 | A | * | 5/1951 | Monge ................................ | 475/3 |
| 3,492,892 | A | * | 2/1970 | Keizo et al. .................... | 475/259 |
| 3,728,912 | A | * | 4/1973 | Darnell .......................... | 475/290 |
| 3,937,309 | A | * | 2/1976 | Schulz et al. ............... | 192/217.4 |
| 4,630,839 | A | * | 12/1986 | Seol ................................ | 280/255 |
| 4,666,172 | A | * | 5/1987 | Hartmann ..................... | 280/238 |
| 4,702,121 | A | * | 10/1987 | Hartmann ....................... | 74/375 |
| 5,081,877 | A | * | 1/1992 | Mercat ............................ | 74/116 |
| 5,121,936 | A | * | 6/1992 | Cowan ........................... | 280/236 |

(Continued)

FOREIGN PATENT DOCUMENTS

| | | |
|---|---|---|
| TW | 201350380 A | 12/2013 |
| TW | 201350706 A | 12/2013 |

(Continued)

*Primary Examiner* — Joseph Rocca
*Assistant Examiner* — Michael Stabley
(74) *Attorney, Agent, or Firm* — Muncy, Geissler, Olds & Lowe, P.C.

(57) ABSTRACT

The present invention provides a two wheel vehicle structure, including: a vehicle frame and a multi-ratio transmission system. The vehicle frame has two wheels and an input tubular member. A crank is attached at each end of the input tubular member. The multi-ratio transmission system includes: a multi-ratio transmission device, a first sprocket, a second sprocket and a chain. The multi-ratio transmission device is installed inside the input tubular member and located at a rotation center of the cranks. The second sprocket is coaxially installed on a wheel axle of a driving wheel and is provided with a ratchet wheel. When the cranks rotate, the rotation motion of the cranks are transmitted to the first sprocket through the multi-ratio transmission device, subsequently, the motion is transmitted to the second sprocket from the first sprocket through the chain, thereby propelling the driving wheel to rotate.

5 Claims, 14 Drawing Sheets

(56) References Cited

U.S. PATENT DOCUMENTS

| | | | | |
|---|---|---|---|---|
| 5,215,323 | A * | 6/1993 | Cowan | 280/236 |
| 5,516,132 | A * | 5/1996 | Simkins | 280/236 |
| 5,967,938 | A * | 10/1999 | Benford et al. | 475/297 |
| 6,083,136 | A * | 7/2000 | Shoge | 475/297 |
| 6,852,060 | B1 * | 2/2005 | Ash | 475/296 |
| 6,945,903 | B2 * | 9/2005 | Miller | 476/37 |
| 7,148,582 | B2 * | 12/2006 | Matsueda et al. | 290/1 C |
| 7,445,223 | B2 * | 11/2008 | Hong | 280/260 |
| 7,914,029 | B2 * | 3/2011 | Miller et al. | 280/261 |
| 8,235,859 | B2 * | 8/2012 | Yun | 475/290 |
| 8,474,346 | B2 * | 7/2013 | Matsumoto | 74/340 |
| 2006/0122026 | A1 * | 6/2006 | Schlumpf | 475/314 |
| 2009/0062057 | A1 * | 3/2009 | Fujiwara | 475/305 |
| 2010/0069194 | A1 * | 3/2010 | Cheng | 475/269 |
| 2013/0017922 | A1 * | 1/2013 | Song | 475/290 |

FOREIGN PATENT DOCUMENTS

| | | |
|---|---|---|
| TW | 201350707 A | 12/2013 |
| TW | 201350708 A | 12/2013 |
| TW | 201350709 A | 12/2013 |
| TW | 201350710 A | 12/2013 |

* cited by examiner

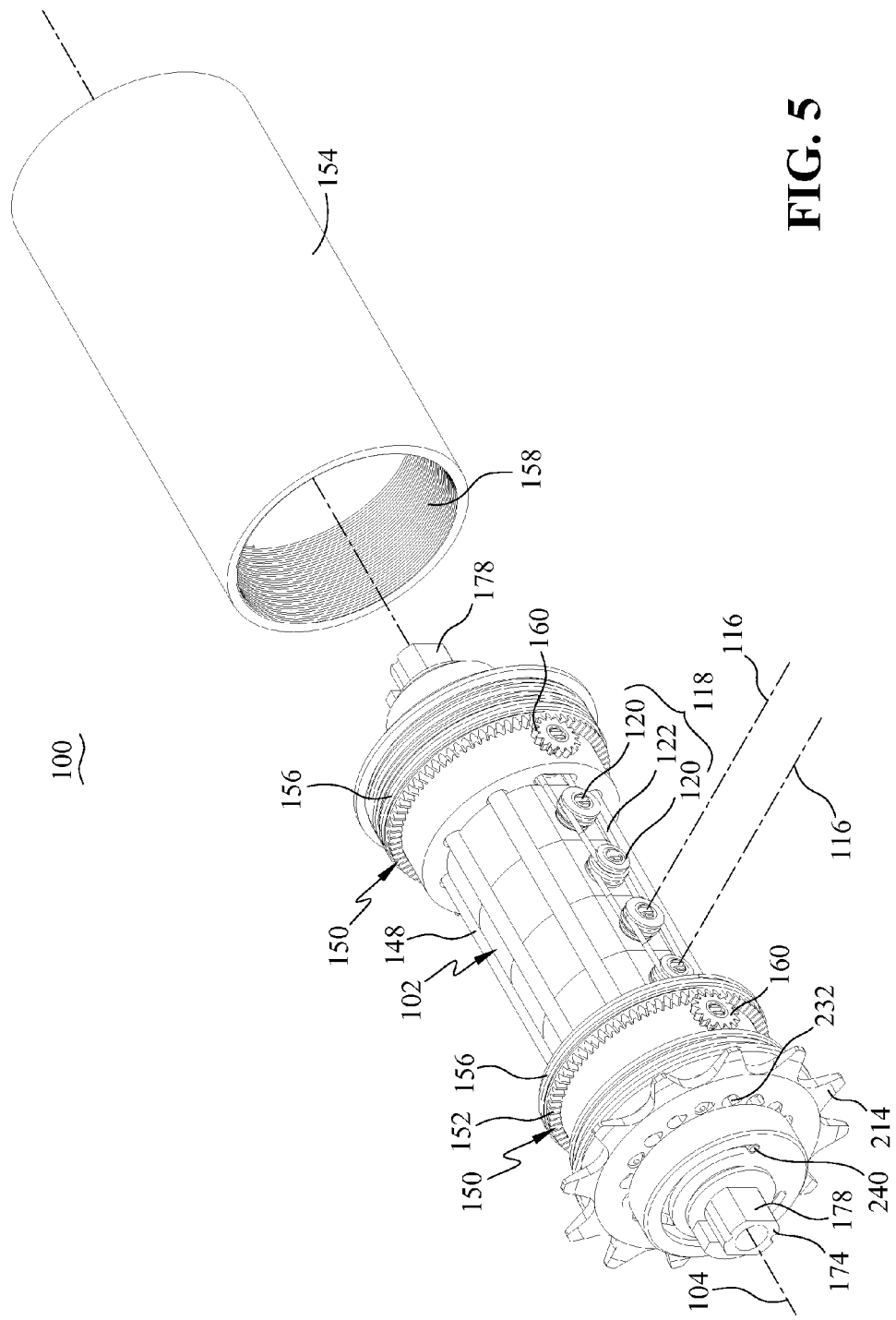

TWO-WHEEL VEHICLE STRUCTURE

CROSS-REFERENCE TO RELATED APPLICATION

This application claims the priority of Taiwanese patent application No. 102137031, filed on Oct. 14, 2013, which is incorporated herewith by reference.

BACKGROUND OF THE INVENTION

1. Field of the Invention

The present invention relates generally to a two-wheel vehicle structure, more particularly, relates to a two-wheel vehicle structure of which a multi-ratio transmission device is installed at the rotation center of the crank.

2. The Prior Arts

In order for two-wheel vehicles to be ridden easily in different road conditions or different environmental conditions, two-wheel vehicles, e.g. bicycle, electric bicycle, on the market nowadays are usually equipped with multi-ratio transmission systems, so the rider can adjust gear ratios according to the conditions of the road, thereby riding the vehicle with less effort.

Bicycle derailleur is one of the commonly seen multi-ratio transmission systems, which mainly consists of different sizes of sprockets. As shown in FIG. 1, a conventional bicycle derailleur system 900 includes multiple sprockets 902 which are coaxially disposed on the bicycle along bicycle wheel axle 904, e.g. the rear bicycle wheel axis. The sprockets 902 are connected to the bicycle pedals through a chain 906. In the system as described above, derailing the chain 906 between sprockets 902 of different sizes can change the rotation speed ratio between the rear bicycle wheel and the pedal. Due to the nature of the structure of the derailleur, the axial size of the derailleur system would increase as more sprockets are added to the system. Therefore, only a limited number of sprockets can be used in such derailleur system to prevent the size of the system from becoming too large and thus affecting the structure of the bicycle. To be more specific, if the size of the derailleur becomes too large, the bicycle frame can become eccentric and the chain of the transmission system can be dislocated during the derailing, thereby resulting in the loss of kinetic energy during transmission and further affecting the operation of the bicycle. However, since each sprocket represents a different rotation speed, the number of the sprockets determines the number of transmission ratios available in a bicycle derailleur system. Hence, under the condition that the number of sprockets is limited, the number of the transmission ratios that can be provided by the derailleur is also limited.

Another type of multi-ratio transmission system commonly seen on bicycles is the multi-ratio hub, which utilizes planet gear systems to achieve the multi-ratio effect. Planet gear system is an effective way to reduce the size of the gear transmission system in the mechanical industry. FIG. 2 is an example of a commonly seen planet gear system. As shown in FIG. 2, the planet gear system 940 includes a sun gear 942 and an annular gear 944. The sun gear 942 and the annular gear 944 are coaxially disposed to form an annular space within. Multiple planet gears 946 are placed inside the annular space to simultaneously engage with the sun gear 942 and the annular gear 944. With such configuration, the sun gear 942, the annular gear 944 and the planet gears 946 basically rotate in different speed. When the planet gear system as described above is in use, each of the sun gear, the planet gear and the annular gear serve as the input end or the output end to change the rotation speed and the torque between the input end and the output end. However, the number of transmission ratio that can be achieved by a single planet gear system is limited; hence, two sets or more of the planet gear systems are often coupled together in the axial direction to increase the number of the transmission ratio or torque available. In addition, the rotation axes of the planet gears are parallel to the rotation axis of the sun gear, which can still result in the increase of the overall size of the system, the abrasion of the gear due to the direct force exerted thereupon and the loss of mechanical kinematic energy.

In order to solve the abovementioned problems, the applicant has invented a multi-ratio transmission system with parallel vertical and coaxial planet gears, and was filed as TW patent application No. 101120752, 101120748, 101120934, 101120938, 101120940, 101120943. The multi-ratio transmission system with parallel vertical and coaxial planet gears not only provides a significant number of gear ratios available, but also greatly reduced the weight and over all size of the multi-ratio transmission system. Compared with other conventional transmission systems, such multi-ratio transmission system is more suitable to be installed on a bicycle. Due to the limit in size, conventional multi-ratio transmission systems are all installed on the wheel axle of the rear wheel in conventional two-wheel structures. When the rider pushes the pedals, the rotation motion is transmitted to the transmission system via a chain so as to propel the rear wheel. In the configuration of the conventional transmission system on the conventional vehicle structure as described above, work done by the rider is not directly exerted into the transmission system; therefore, the kinetic energy generated by the rider by pushing the pedals to rotate certainly will suffer some loss when it is transmitted to the transmission system installed at the rear wheel via the chain. In addition, other factors such as the dislocation of the chain during gear-shifting can cause more energy loss, thereby resulting in a waste of the output power generated by the rider. Furthermore, in addition to the multi-ratio transmission system, the wheel axle of the rear wheel also has to bear the weight of the rider and the frame, thus the axle of the transmission system can be easily damaged. Moreover, the size of transmission system in conventional bicycle usually varies corresponding to the number of gear ratio being provided; hence, the frame structure also needs to be adjusted according to the size of the transmission system. In order to install transmission system with a larger size, the bicycle frame may have an eccentric structure, which can cause difficulty in mass manufacture and application thereof.

Therefore, it is urgently needed for the industry to develop a two-wheel vehicle structure, which can provide a large number of transmission ratios and a better output efficiency while reducing the energy loss in the transmission system. In addition, the two-wheel vehicle structure should also lower the failure rate of the transmission system, provide a more convenient way of usage and make the mass manufacture process of the frame easier.

SUMMARY OF THE INVENTION

A primary objective of the present invention is to provide a two-wheel vehicle structure. The two-wheel vehicle structure can provide a large number of transmission ratios and a better output efficiency while reducing the energy loss in the transmission system by installing the multi-ratio transmission system at the rotation center of the cranks to which the pedals are attached.

Another objective of the present invention is to provide a two-wheel vehicle structure which can lower the failure rate of the transmission system.

A further objective of the present invention is to provide a two-wheel vehicle structure which can provide a more convenient way for usage.

A further objective of the present invention is to simplify the mass manufacture process of the frame.

For achieving the foregoing objectives, the present invention provides a two wheel vehicle structure, including: a vehicle frame and a multi-ratio transmission system. The vehicle frame is equipped with a handle and two wheels, and at least one of the wheels is a driving wheel. The vehicle frame includes an input tubular member. A crank is attached at each end of the input tubular member, and a pedal is attached on each said crank. The multi-ratio transmission system includes: a multi-ratio transmission device having a first sprocket, a second sprocket and a chain. The multi-ratio transmission device is installed inside the input tubular member and located at a rotation center of the cranks. The first sprocket is located at an outer side of the input tubular member and is located between the input tubular member and one of the cranks. The multi-ratio transmission device is connected to a shift lever, which is installed on the handle, with a shift cable. The second sprocket is coaxially installed on a wheel axle of the driving wheel, and is located on a same side of the vehicle frame with the first sprocket. A ratchet wheel is disposed on the second sprocket, and a pawl is disposed on the wheel axle of the driving wheel for engaging with the ratchet wheel. The chain is winded around and engaged with the first sprocket and the second sprocket. When the cranks rotate, the rotation motion of the cranks are transmitted to the first sprocket through the multi-ratio transmission device, subsequently, the motion is transmitted to the second sprocket from the first sprocket through the chain, thereby propelling the driving wheel to rotate.

According to an embodiment of the present invention, the multi-ratio transmission device includes: multiple planet gear sub-systems, a coupling assembly, a setting element, a setting element controller, an annular gear, a cylindrical casing and a central axle. The planet gear sub-systems are coaxially disposed in series along a first axis. Each of the planet gear sub-system includes: a sun gear and at least one planet gear. The sun gear is coaxially disposed along the first axis and rotates around the first axis optionally. The planet gear is coaxially disposed along a second axis, which is vertical to the first axis, and rotates around the second axis. The coupling assembly is disposed between every two adjacent planet gear sub-systems so as to transmit the rotation of the planet gear of the former planet gear sub-system to planet gear of the latter planet gear sub-system between two adjacent planet gear sub-systems. The setting element is disposed corresponding to each planet gear sub-system. The setting element optionally moves in the direction of first axis so as to optionally engage with the sun gear of the planet gear sub-system. The setting element controller has a hollowed tube, which is disposed coaxially with the first axis to rotate around the first axis within a range of predetermined angles. The hollowed tube has an outer circumferential surface. A cam groove is formed on the outer circumferential surface in the circumferential direction corresponding to each of the setting element of the planet gear sub-system, thereby allowing the setting element to optionally move along the first axis and to optionally engage with the sun gears of the planet gear sub-systems. The annular gear is engaged to the planet gear of at least one planet gear sub-system. The cylindrical casing encloses the planet gear sub-systems. An outer diameter of the cylindrical casing is smaller than an inner diameter of the input tubular member, so the cylindrical casing can be installed inside the input tubular member. The central axle is disposed coaxially with the first axis, and is inserted into a center through hole of the hollowed tube of the setting element controller by relative rotation, thereby enabling the hollowed tube to rotate around the central axle. The first sprocket is installed onto the planet gear sub-systems through a one-way clutch, so the planet gear sub-systems can be driven to rotate by the rotation of the cranks.

According to an embodiment of the present invention, the shift cable is connected to the multi-ratio transmission device inside the input tubular member through an inside of the vehicle frame.

According to an embodiment of the present invention, a gear ratio between the first sprocket and the second sprocket is 1:1.

According to an embodiment of the present invention, a gear ratio of the first sprocket to the second sprocket is larger than 1.

According to an embodiment of the present invention, a gear ratio of the first sprocket to the second sprocket is less than 1.

BRIEF DESCRIPTION OF THE DRAWINGS

The present invention will be apparent to those skilled in the art by reading the following detailed description of a preferred embodiment thereof, with reference to the attached drawings, in which:

FIG. 5 is a perspective view showing a multi-ratio transmission device according to the first embodiment of the present invention;

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention. The preferred embodiments are for illustrative purpose but to limit the scope of the present invention. Those who skilled in the art can make modification to the present invention within the scope defined by the claims of the present invention.

Figure 1:
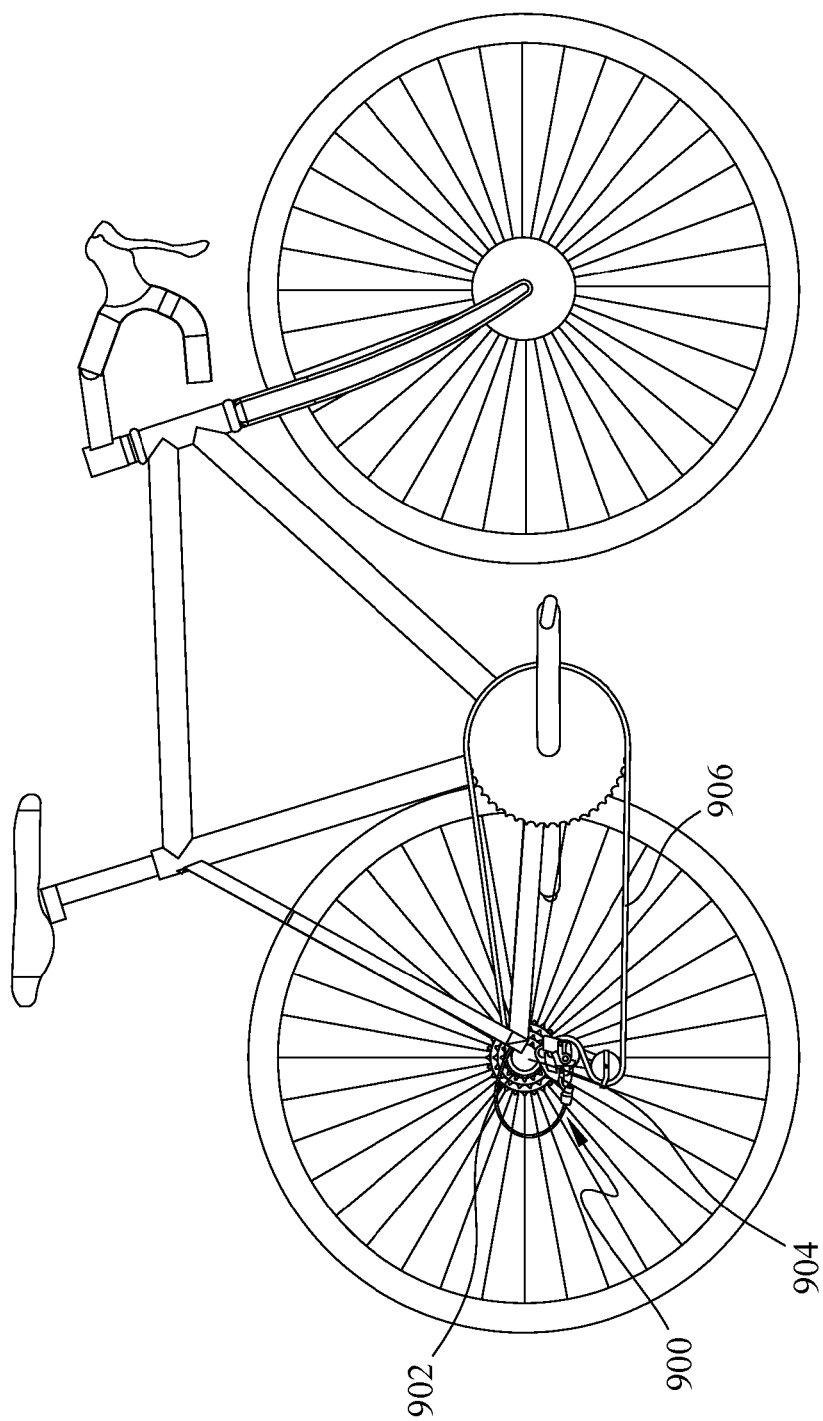
FIG. 1 is a schematic view illustrating a conventional derailleur system of a bicycle.
Figure 2:
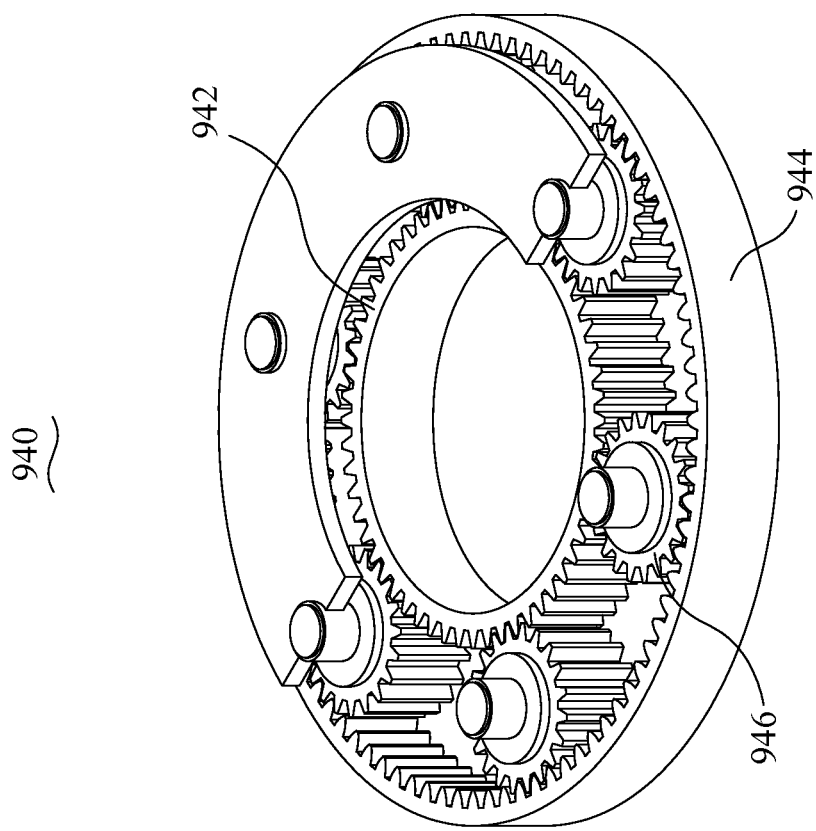
FIG. 2 is a schematic view illustrating a conventional planet gear system.
Figure 3:
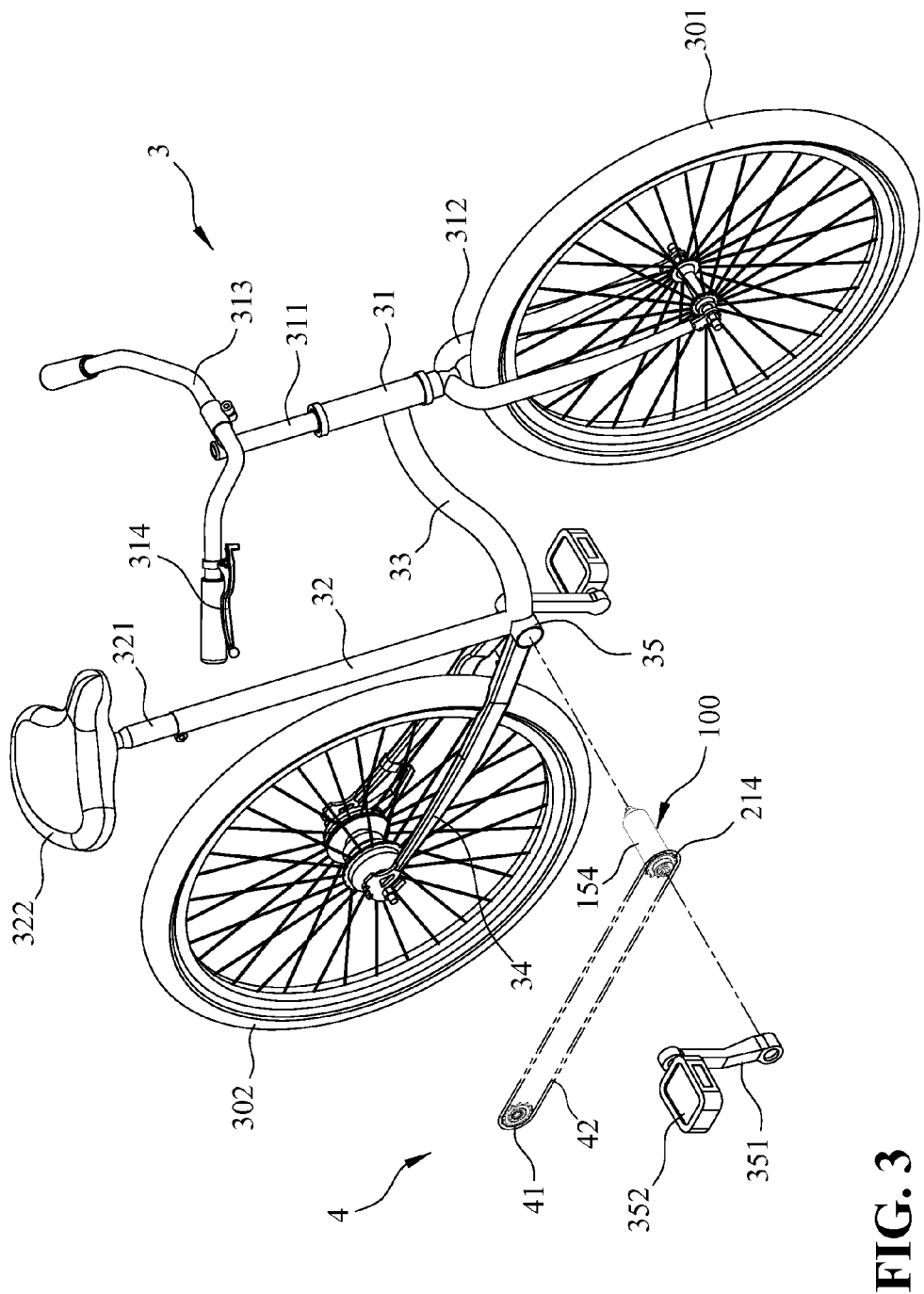
FIG. 3 is a perspective and exploded view showing a two-wheel vehicle structure according to a first embodiment of the present invention.
Figure 4:
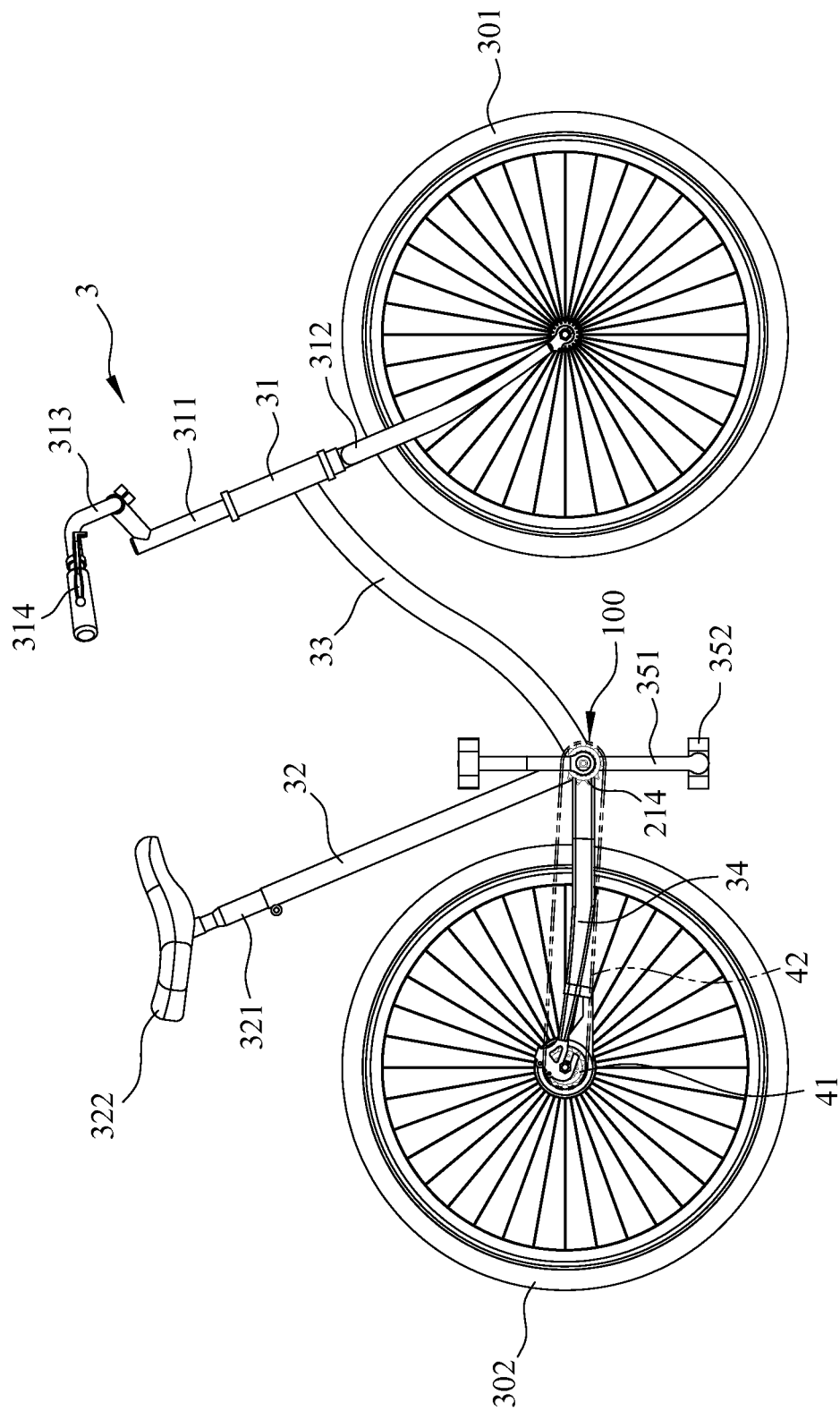
FIG. 4 is a side view showing a two-wheel vehicle structure according to the first embodiment of the present invention.
Figure 6A:
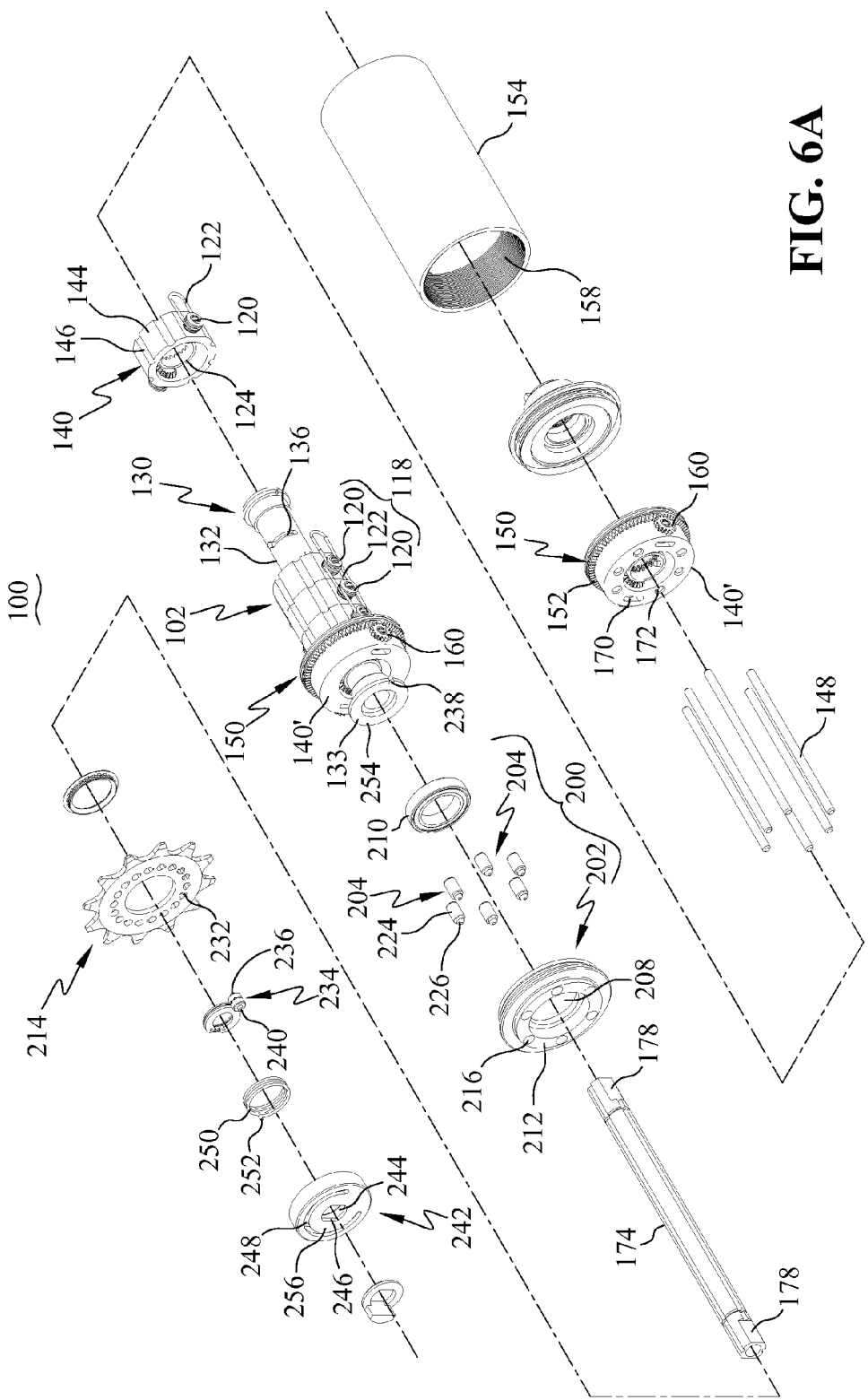
FIG. 6A is an exploded view showing the multi-ratio transmission device according to the first embodiment of the present invention.
Figure 6B:
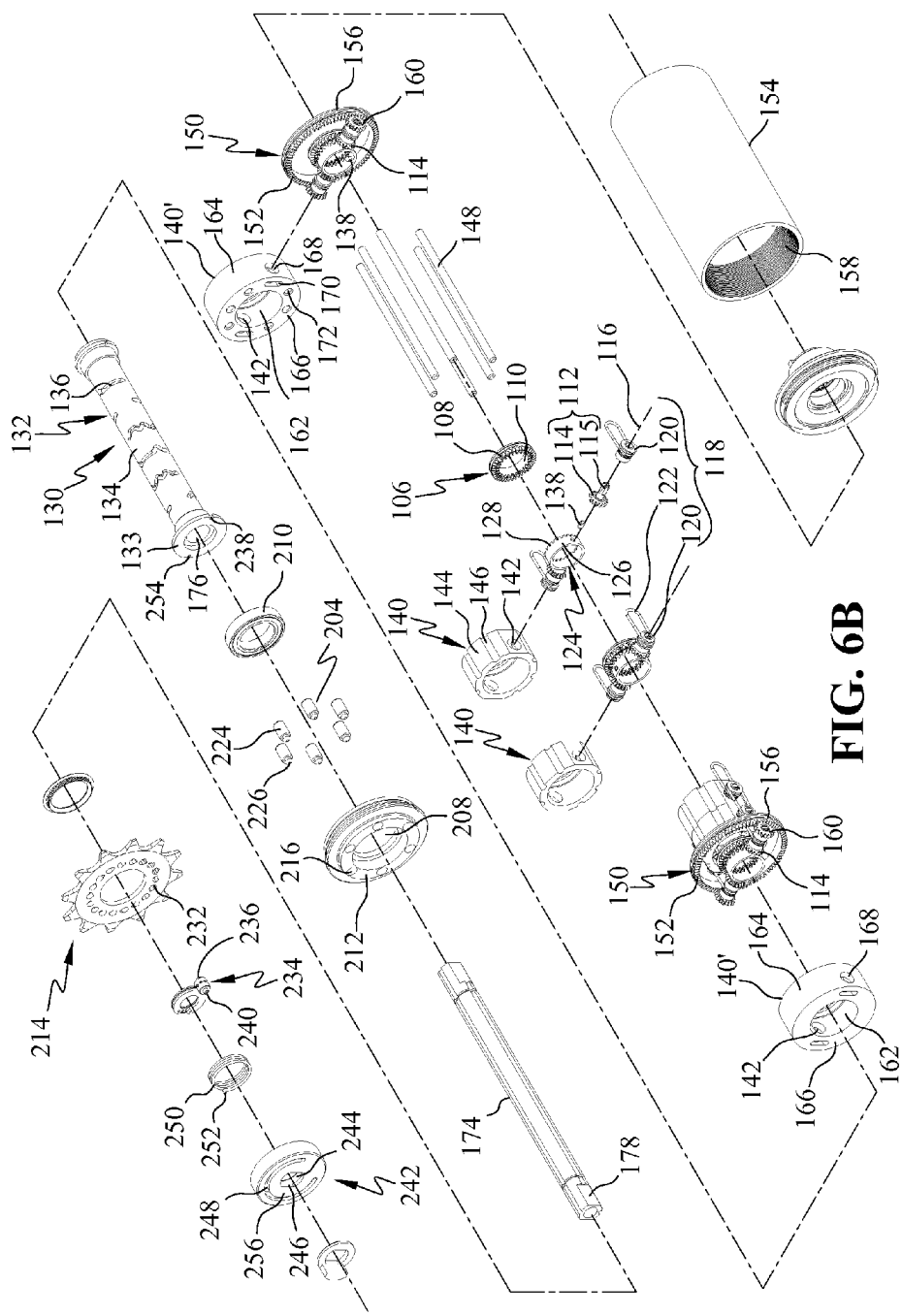
FIG. 6B is another exploded view showing the multi-ratio transmission device according to the first embodiment of the present invention.
Figure 6C:
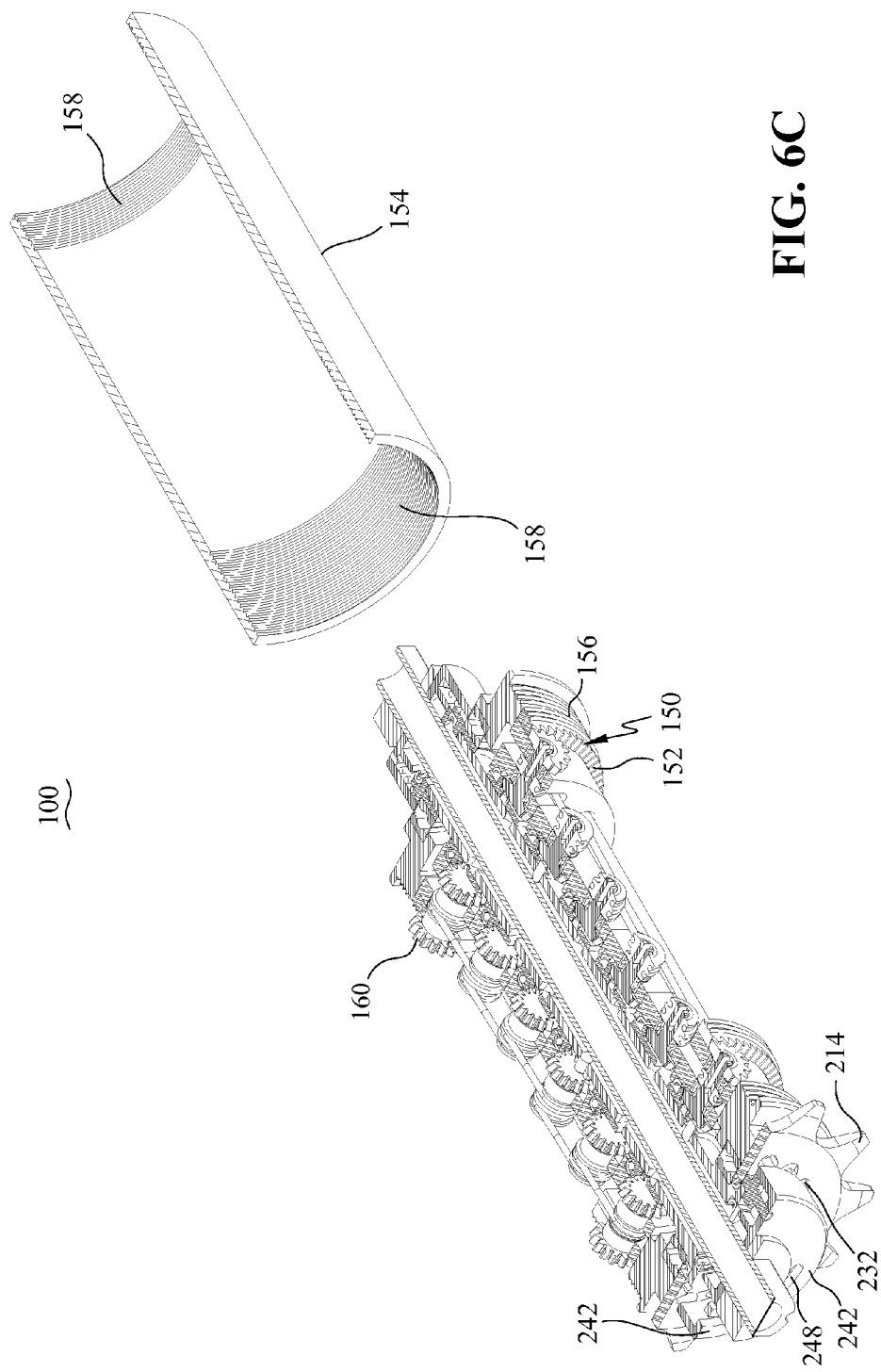
FIG. 6C is a perspective section view showing the multi-ratio transmission device according to the first embodiment of the present invention, where the cylindrical casing is detached.
Figure 7A:
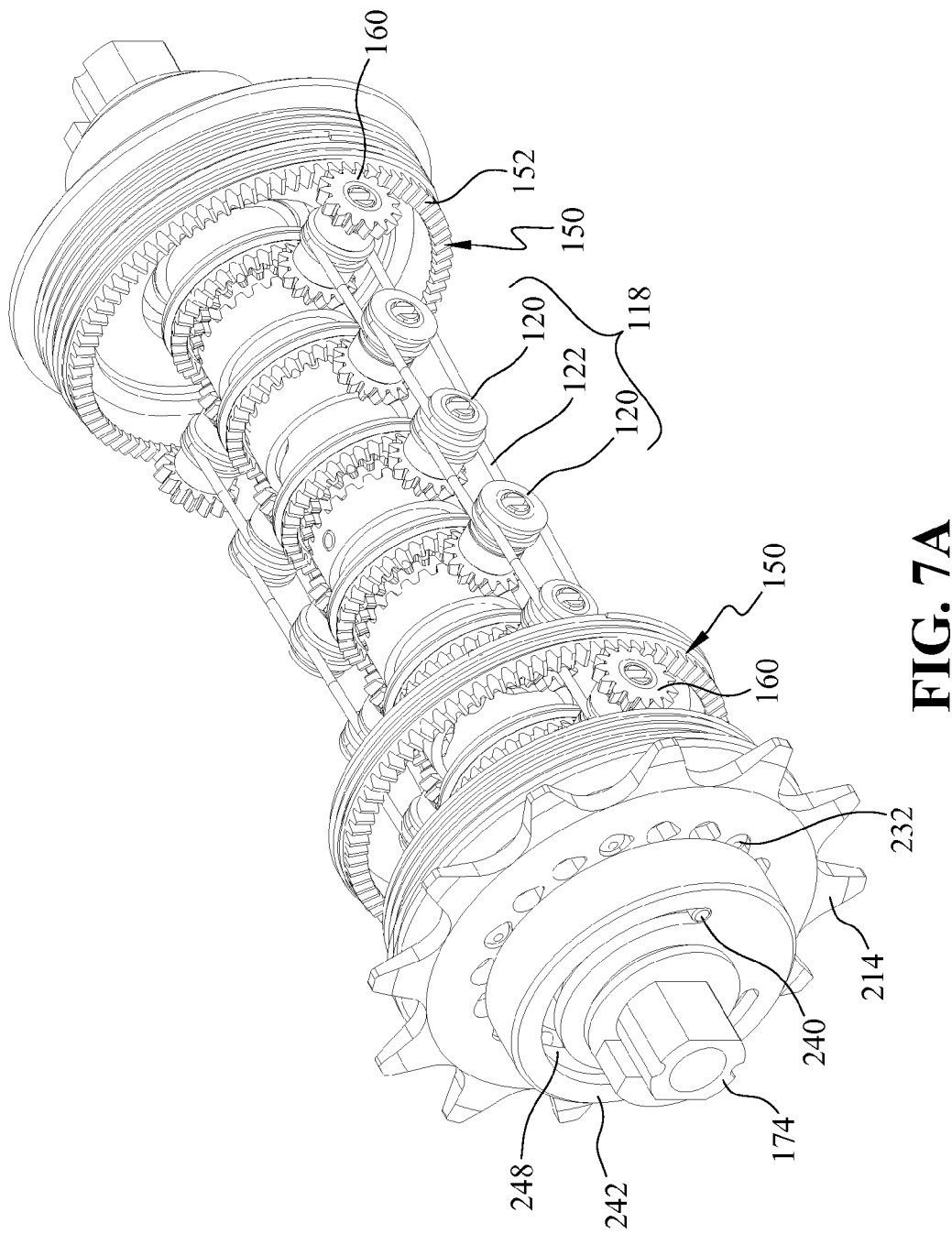
FIG. 7A is a perspective view showing the multi-ratio transmission device according to the first embodiment of the present invention, where the cylindrical casing and the annular bases of each planet gear sub-systems are omitted for a better view of the internal structure.
Figure 7B:
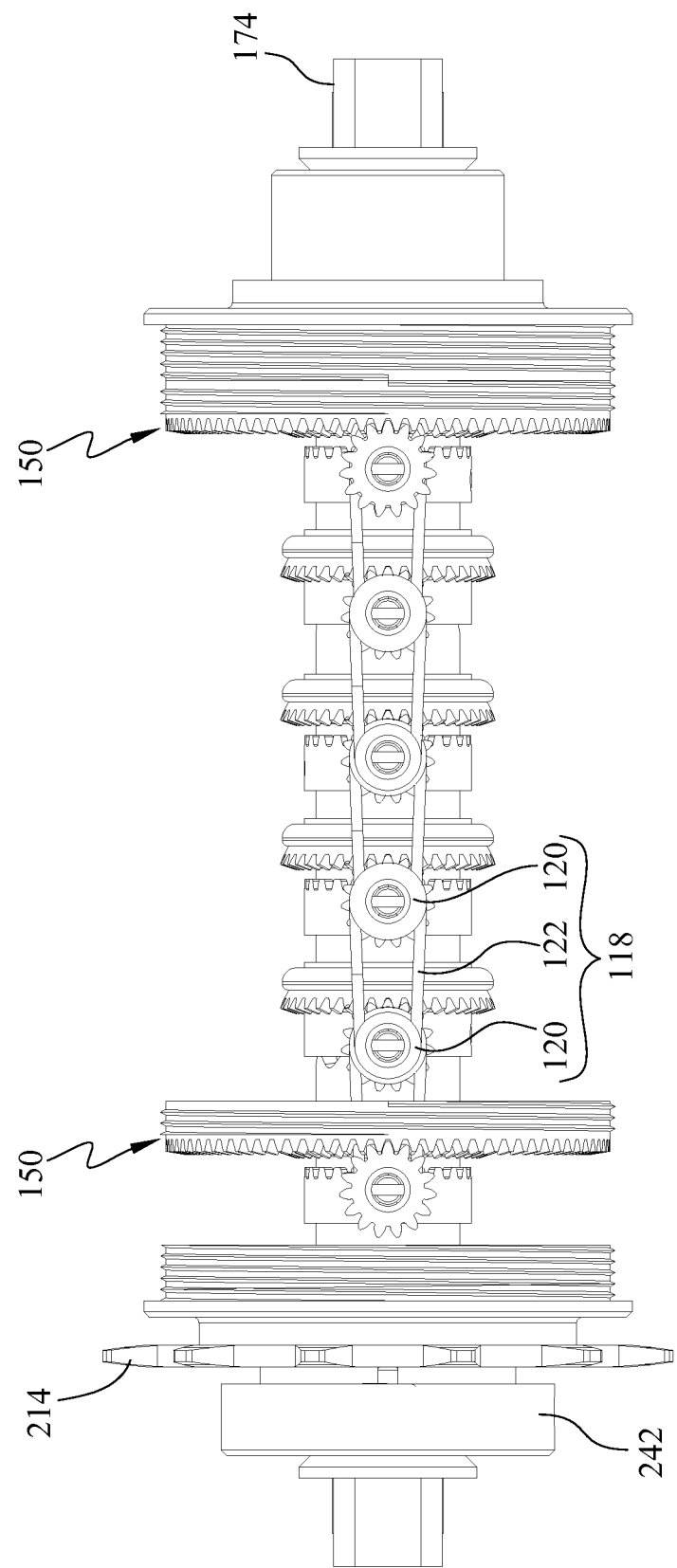
FIG. 7B is a side view of FIG. 7A.
Figure 7C:
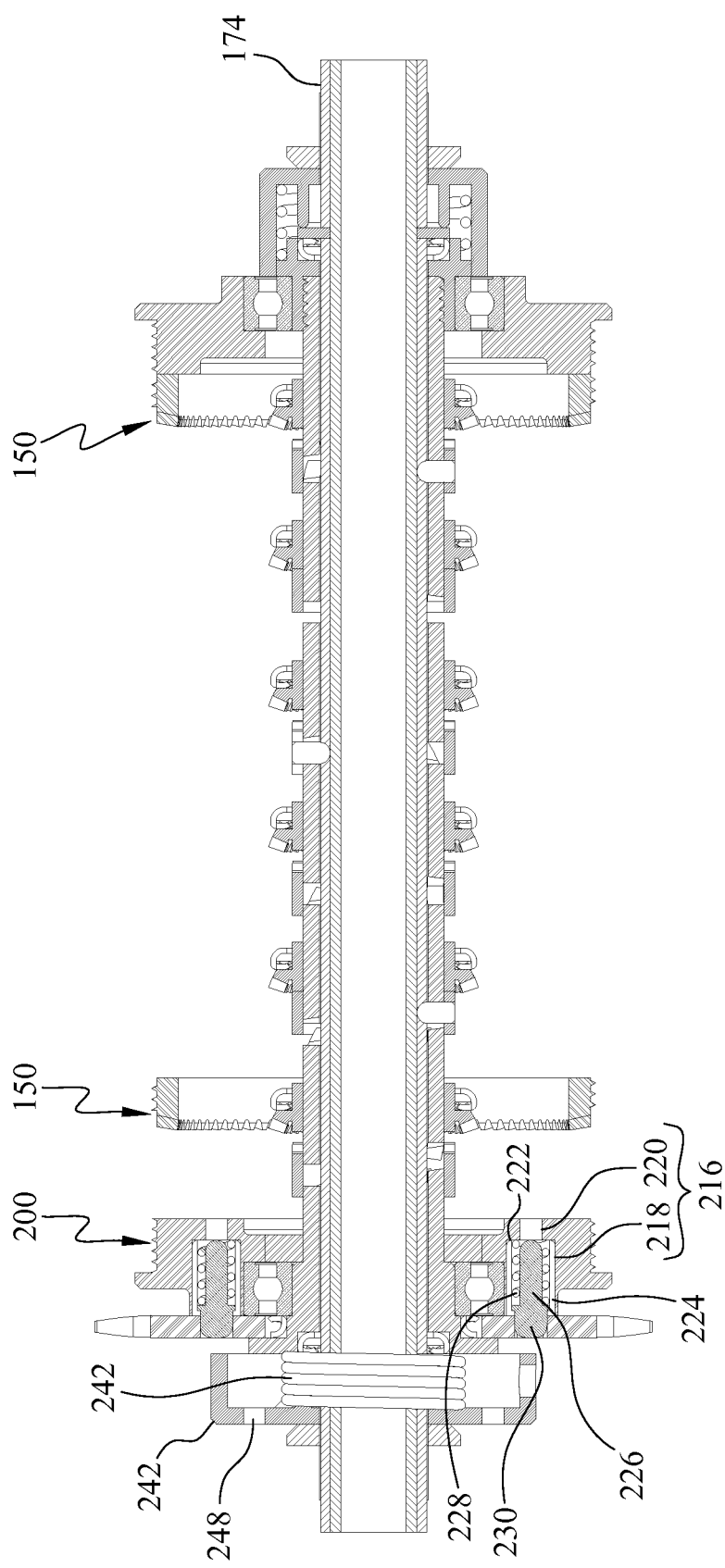
FIG. 7C is a sectional view showing the multi-ratio transmission device according to the first embodiment of the present invention, where some components are omitted.

FIG. 3 is a perspective and exploded view showing a two-wheel structure according to a first embodiment of the present invention; FIG. 4 is a side view showing the two-wheel structure according to the first embodiment of the present invention. As shown in FIG. 3 and FIG. 4, the two-wheel vehicle structure of the present invention mainly includes a vehicle frame 3 and a multi-ratio transmission system 4. According to the purpose of the two-wheel vehicle, there are many kinds of vehicle frames with different shapes available. In the embodiments of the present invention, the frame of a bicycle is described as the vehicle frame as an example. The configuration described herein is for illustrative purpose only but to limit the structure of the vehicle.

In the first embodiment of the present invention, the vehicle frame 3 includes: a head tube 31, a seat tube 32, a vehicle body 33, a rear fork 34 and an input tubular member 35. A steering tube 311 is installed at an end of the head tube 31, and a front fork 312 is installed at the other end of the head tube. A handle 313 is attached to the steering tube 311, and a front wheel 301 is installed at the front fork 312. A seat 322 is installed at the top of the seat tube 32 through a seating post 321. The head tube 31 is connected to the seat tube 32 by the vehicle body 33. The rear fork 34, at which a rear wheel 302 is installed, is connected to the seat tube 32. The input tubular member 35 is a hollowed tubular member, and is located at a point where the rear fork 34, the vehicle body 33 and the seat tube intersect with each other. A crank 351 is attached at each end of the input tubular member 35, and a pedal 352 is attached to an end of each crank 351.

The multi-ratio transmission system 4 includes: a multi-ratio transmission device 100, a second sprocket 41 and a chain 42. The multi-ratio transmission device 100 includes a first sprocket 214. The multi-ratio transmission device 100 is installed inside the input tubular member 35 and is located at a rotation center of the cranks 351. Herein, the multi-ratio transmission device can be installed inside the input tubular member 35 by any conventional mounting methods. The first sprocket 214 is located at an outer side of the input tubular member 35, and is located between the input tubular member 35 and one of the cranks 351. The multi-ratio transmission device 100 as described is connected to a shift lever 314, which is installed on the handle 313 through a shift cable (not shown). The second sprocket 41 is coaxially installed on a wheel axle of a driving wheel, and is located on a same side of the vehicle frame 3 as the first sprocket 214. In the first embodiment, the driving wheel of the two-wheel vehicle is the rear wheel 302. Therefore, the second sprocket 41 is coaxially disposed on the wheel axle of the rear wheel 302. The chain 42 is winded around and engaged with the first sprocket 214 and the second sprocket 41.

Herein, the shift cable is connected to the shift lever 314 through an inside of the vehicle frame 3. Specifically, the shift cable is entered into the input tubular member 35, and passes through the insides of the vehicle body 33, the head tube 31 and the steering tube 311 to be connected to the shift cable 314 at the handle 313. With such wiring configuration, torque rings, which are used to mount the shift cable onto the vehicle frame in conventional vehicle structure, are no longer needed, and the shift cable does not need to be wired all the way to the rear end of the frame. As a result, such wiring configuration not only reduces the overall weight of the vehicle body, but also provides a new wiring choice which reduces the wiring distance and lower the wiring difficulty. In addition, such wiring configuration also provides a cleaner outlook for the vehicle.

Besides, in order to stop the chain from rotating when the rider is not pushing the pedals, generally, ratchets are disposed at the wheel axle of the rear wheel, so the rotation of the driving wheel is not transmitted back to the cranks and pedals through the chains and sprockets in the above situation. In conventional bicycle structures, since the multi-ratio transmission device is also installed at the wheel axle of the rear wheel, it is common for the ratchets to be disposed integrally with the multi-ratio transmission device. Consequently, not only the structure of the multi-ratio transmission device becomes complicated, the maintenance and detaching process of the multi-ratio transmission device also becomes rather difficult. In the present invention, since the installation location of the multi-ratio transmission device 100 has been relocated to the rotation center of the cranks from the wheel axle of the rear wheel, namely, inside the input tubular member 35, thus providing a new configuration choice for users. Namely, user can choose to move the ratchets (not shown) to the rotation center of the cranks along with the multi-ratio transmission device 100, or, users may also choose to install the ratchets separately from the multi-ratio transmission device 100. The situation of the latter will be explained in detail along with the structure of the multi-ratio transmission device 100.

According to the first embodiment of the present invention, when the rider pushes the pedals 352 to rotate the cranks 351, first, the torque and rotational motion generated is transmitted to the first sprocket 214 through the multi-ratio transmission device 100, subsequently, the motion is transmitted to the second sprocket 41 through the chain 42. Lastly, the rotation motion is transmitted to the rear wheel 302 from the second sprocket 41, thereby propelling the rear wheel 302 to rotate. Herein, the gear ratio between the first sprocket 214 and the second sprocket 41 is 1:1. With the above configuration, the torque generated when the riders pushes the pedals 352 to rotate the cranks 351 is input directly into the multi-ratio transmission device 100, undergoes the speed changing effect of the multi-ratio transmission device 100, and then is output to the first sprocket 214. In other words, assuming the gear ratio of the multi-ratio transmission device is N:1, then, when the rider rotates the cranks 351 for one revolution, the first sprocket 214 at the output end rotates for N revolutions. Namely, when the number of revolutions of the cranks 351 rotated by the rider is same, the vehicle according to the above configuration can move further comparing with conventional vehicles.

By installing the multi-ratio transmission device at the rotation center of the cranks, that is, by installing the multi-ratio transmission device into the axis center of the input axle of the vehicle, the two-wheel vehicle structure provided by the present invention allows the rider to directly do work into the multi-ratio transmission device, which is different from the configuration of conventional bicycle structures in which the derailleur is installed at the wheel axle of the rear wheel.

In the configuration provided by the present invention, since the torque and rotational motion generated by rotating the cranks does not need to go through the chain to be transmitted to the multi-ratio transmission device installed at the rear wheel, thus reducing the loss of kinetic energy, and providing a more efficient energy transmission.

Furthermore, in conventional bicycles, the wheel axle of the rear wheel not only is installed with the derailleur, but also needs to bear the weight of the vehicle and the rider; therefore, the axle of the multi-ratio transmission device in conventional bicycles are more likely to be damaged thus needing maintenance. By installing the multi-ratio transmission device 100 into the input tubular member 35, the multi-ratio transmission device 100 in the present invention does not need to bear extra and unnecessary forces, thereby reducing the chances for the multi-ratio transmission device 100 to be damaged and prolonging the usage life of the axle of the multi-ratio transmission device.

In a second embodiment of the present invention, except for the transmission method of the force, the rest of the configuration of the two-wheel vehicle structure is the same as the first embodiment. Therefore, only the difference between the first embodiment and the second embodiment will be explained below. According to the second embodiment of the present invention, when the rider pushes the pedals 352 to rotate the cranks 351, the torque and rotational motion generated rotates the first sprocket 214 directly before being transmitted into the multi-ratio transmission device. Subsequently, the power is transmitted to the second sprocket 41 through the chain 42. Lastly, the rotational power of the second sprocket 41 is transmitted to the rear wheel 302, thereby propelling the rear wheel 302 to rotate. Herein, the gear ratio between the first sprocket 214 and the second sprocket 41 is 1:1. According to the configuration of the second embodiment, when the rider pushes the pedals 352 to rotate the cranks 351 for one revolution, the second sprocket 41 also rotates for one revolution. However, the rider is able to rotate the cranks 351 with less effort comparing with transmission method described in the first embodiment. In other words, the configuration of the second embodiment requires less effort to operate.

The multi-ratio transmission device 100 used in the present invention is a multi-ratio transmission system with parallel vertical and coaxial planet gears invented by the applicant of the present invention. The structure and configuration of the multi-ratio transmission device 100 will be explained in details below with reference to FIG. 5, FIG. 6A, FIG. 6B, FIG. 6C, FIG. 7A, FIG. 7B and FIG. 7C.

The multi-ratio transmission device 100 of the present invention includes multiple planet gear sub-systems. Herein, the multi-ratio transmission device 100 includes six planet gear sub-systems 102. The six planet gear sub-systems 102 are coaxially placed in series along a common axis, which is defined as a first axis 104. Each planet gear sub-system 102 includes a sun gear 106, which is configured to rotate around the first axis 104. The sun gear 106 includes an outer gear 108 and an inner gear 110, and the outer gear 108 and the inner gear 110 are connected coaxially relative to each other. The outer gear 108 is a bevel gear and is located at an outer side of the inner gear 110.

Each planet gear sub-system 102 further includes at least one planet gear set 112 having a planet gear 114. The planet gear 114 is a bevel gear, and is able to engage with the outer gear 108 of the sun gear 106. The planet gear 114 is disposed on an axle 115 so as to rotate around a second axis 116. The second axis 116 is perpendicular to the first axis 104, and is defined by the axis of the axle 115. Notably, the second axis 116 of the planet gear 114 in each planet gear sub-system 102 is perpendicular to the first axis 104, and is configured to be parallel with each other.

Considering the balance of the forces, each planet gear sub-system 102 includes two planet gears 114 in the embodiments of the present invention. The two planet gears 114 are configured to be opposite to each other, in other words, the two planet gears 114 are 180 degrees apart from each other. However, the number of the planet gears 114 is not limited hereby. If necessary, each planet gear sub-system 102 can include three or more planet gears 114 that are configured symmetrically about the axis (or not symmetrically about the axis).

A coupling assembly 118 is used to couple two adjacent planet gear sub-systems 102 together, so that the rotation of the planet gear 114 of the former planet gear sub-system 102 is transmitted to the planet gear 114 of the latter planet gear sub-system 102. Herein, the coupling assembly 118 includes two pulleys 120. Each pulley 120 is connected to the axles 115 of the planet gear sets 112 of the two adjacent planet gear sub-systems 102 so as to rotate in synchronization with the planet gears 114 of the planet gear sets 112. A belt 122 is trained around the two pulleys 120 to connect the two pulleys, so the rotation of the planet gear 114 of the former planet gear sub-system is transmitted through the axle 115 and the pulleys 120 to the planet gear 114 of the latter planet gear sub-system 102.

It is worth noting that except for the first (the front) and the last (the rear) planet gear sub-system 102, each axle 115 of the planet gear 114 in the rest of the planet gear sub-systems is installed with two pulleys 120. The two pulleys 120 installed on the axle 115 are connected to the pulley 120 of the former planet gear sub-systems 102 and to the pulley 120 of the latter planet gear sub-systems 102 with two belts 122. In the following description, the first planet gear planet sub-system 102 refers to the first planet gear sub-system 102 connected adjacently to a sprocket 214 (please refer to the following description). The last planet gear subsystem 102 refers to the very last planet gear sub-system 102 in the series of planet gear sub-systems 102 relative to the first planet gear sub-system 102.

In addition, each planet gear sub-system 102 further includes a setting element 124. The setting element 124 is able to optionally move along the first axis 104 so as to engage and secure the sun gear 106 of the planet gear sub-system 102, or disengage from the sun gear 106 of the planet gear sub-system 102. In the present invention, the setting element 124 is a crown gear and has a hollowed cylinder 126. The setting element 124 is disposed coaxially with the sun gear 106, and is able to move along the first axis 104 corresponding to the sun gear 106. Teeth 128 are formed at an end of the hollowed cylinder 126 of the setting element 124 facing the inner gear 110 of the sun gear 106. When the setting element 124 moves toward the sun gear 106, the teeth 128 engage the inner gear 110 of the sun gear 106, thereby securing the sun gear 106. When the setting element 124 moves away from the sun gear 106, the teeth 128 of the setting element 124 disengaged from the inner gear 110, thereby releasing the sun gear 106 for free rotation. With the configuration described above, different gear ratios are provided based on the engagement statuses of the sun gears 106 of the planet gear sub-systems 102.

The multi-ratio transmission device 100 of the present invention further includes a setting element controller 130. The setting element controller 130 is connected to the setting element 124 of each planet gear sub-system 102, so as to enable the setting element 124 to engage with the sun gear 106 or to disengage from the sun gear 106. Herein, the setting element controller 130 includes a hollowed tube 132. The hollowed tube 132 is disposed coaxially with the first axis 104, and is able to rotate around the first axis 104 in a range of predetermined angles. The hollowed tube 132 has two ends. At least one end of the hollowed tube 132 is installed with a rotation controller 133 for optionally rotating the hollowed tube 132 within the range of predetermined angles. The hollowed tube 132 has an outer circumferential surface 134, where multiple cam grooves 136 are formed generally in the circumferential direction. In the embodiments of the present invention, six cam grooves 136 are formed corresponding to the setting elements 124 of the six planet gear sub-systems 102. The hollowed cylinder 126 of each setting element 124 has an inner circumferential surface (not numbered). A control pin 138 is installed on the inner circumferential surface in such way that the free end of the control pin 138 is inserted into the corresponding cam groove 136, so the control pin 138 moves along the cam groove 136 on the outer circumferential surface 134 in the circumferential direction. Hence, when the rotation controller 133 rotates the hollowed tube 132 of the setting element controller 130 in the range of predetermined angles, the setting elements 124 of all six planet gear sub-systems 102 move in the axial direction along the first axis 104 corresponding to the cam grooves 136 due to the control pins 138 inserted in the cam grooves 136. In this way, the setting elements 124 move closer to or away from the sun gears 106, and thereby engaging with or disengaging from the corresponding sun gears 106. By designing different shapes for different cam grooves 136, each setting element 124 can move in different axial directions and thereby granting different gear ratios.

In the embodiments of the present invention, the depth of the cam groove 136 of the setting element controller 130 is the same as the wall thickness of the hollowed tube 132; however, the depth of the cam groove 136 can also be configured to be smaller than the wall thickness of the hollowed tube 132.

Each planet gear sub-system 102 further includes an annular base 140. A circular wall structure is formed on the annular base 140 surrounding the setting element 124 and the planet gears 114, and is coaxially disposed with the first axis 104. A hole 142 is drilled on the annular base 140 corresponding to the axle 115 of the planet gear set 112 for fitting the axle 115. Herein, the inner end of the axle 115 (located inside the annular base 140) and the outer end (located outside the annular base 140) are installed with the planet gear 114 and the pulley 120 respectively. In this way, the planet gear 114 is located inside the annular base 140, and the pulley 120 is located outside the annular base 140.

The annular bases 140 of the first (the front) and the last (the rear) planet gear sub-systems 102 are different from the annular bases of the rest of the planet gear sub-systems 102. For clarity, the annular bases of the first and the last planet gear sub-system 102 hereafter are referred to as the "end annular base" in the following section, and is numbered as 140'. The rest of the annular bases 140 are referred to as the "midsection annular base". The end annular base 140' is formed with an inner circular wall 162 and an outer circular wall 164. The inner circular wall 162 is formed with an axial end and is formed corresponding to the circular wall structure of the midsection annular bases 140. The outer circular wall 164 coaxially surrounds the inner circular wall 162, and is connected to the inner circular wall 162 through a connecting portion 166 respectively at both ends. Similar to the midsection annular bases 140, a hole 142 is formed at each inner circular wall 162 of the end annular base 140' for fitting the axle 115 of the planet gear 114. Similarly, another hole 168 is also formed on the outer circular wall 164 for further fitting the axle 115. The transmission gear 160 connected to the axle 115 is located outside the outer circular wall 164 for engaging with the teeth 152 of the annular gear 150 (details of which will be further described later).

The annular bases 140 of the six planet gear sub-systems 102 of the multi-ratio transmission device 100 are interconnected with one another, therefore relative rotation and relative axial movements are not allowed. Each midsection annular base 140 has axial ends. The axial ends of the midsection annular bases 140 abut against one another, and an axial end of each end annular base 140' abuts against the axial end of the adjacent midsection annular base 140, so each annular base 140 cannot move in the axial direction of the first axis 104 separately. On the other hand, at least one axial groove 146 is formed on the outer side surface 144 of each midsection annular base 140. The axial groove extends from an axial end to another axial end of the annular base 140 along the first axis 104. In the embodiments of the present invention, the outer side surface 144 of each midsection annular base 140 has six axial grooves 146. In addition, six securing rods 148 are disposed along the first axis 104 in such way that a part of each securing rod 148 is tightly fitted inside the corresponding axial groove 146 of the midsection annular base 140. In this way, the securing rods 148 penetrates through the axial grooves 146 of each midsection annular base 140 along the first axis 104, so as to prevent relative rotation between the midsection annular bases 140.

Two grooves 170 are formed at the connecting portion 166 of the end annular base 140' facing the midsection annular base 140. The two grooves 170 are the passage way for the belt 122 of the coupling assembly 118 of the planet gear sub-system 102, so the belt 122 passes through the two grooves 170 so as to be trained around the pulleys 120 of the adjacent planet gear sub-system 102. In addition, six securing holes 172 are formed on the connecting portion 166 for receiving and securing the end of the securing rods 148. In this way, the two end annular bases 140' are connected to the four midsection annular bases 140 to prevent relative movements or rotations.

The multi-ratio transmission device 100 of the present invention further includes at least one annular gear 150 for engaging with the planet gear 114 of one of the planet gear sub-systems 102. In the embodiments of the present invention, the multi-ratio transmission device 100 includes two annular gears 150, each annular gear is engaged with the planet gear 114 the first and the last planet gear sub-systems respectively. The annular gear 150 is a crown gear. Teeth 152 are formed at one axial end of the annular gear 150 for engaging with the corresponding planet gears 114, and the outer circumferential surface of the annular gear 150 corresponding to the first planet gear sub-system 102 is installed at an inner circumferential surface of a cylindrical casing 154. Any conventional methods can be used to install the annular gear 150 onto the cylindrical casing 154. In the embodiments of the present invention, an outer thread 156 is formed on the outer circumferential surface of the annular gear 150 for engaging with an inner thread 158 formed on the inner circumferential surface of the cylindrical casing 154. In this way, the annular gear 150 is mounted securely onto the cylindrical casing 154. Two annular gears 150 engage with the planet gears 114 of the first and the last planet gear sub-systems 102, therefore, the inner thread 158 is formed at the two ends of the inner circumferential surface of the cylindrical casing 154 respectively for engaging with the outer threads 156 of the two annular gears 150. Then, the rest of the planet gear sub-systems 102 are enclosed within the cylindrical casing 154.

According to the present invention, the planet gear set 112 of the first and the last planet gear sub-system 102 further includes a transmission gear 160. The transmission gear 160 is installed onto each axle 115 of the planet gear set 112, so that the transmission gear 160 is disposed coaxially with the axles 115 of the planet gears 114 (coaxial with the axis of the axle 115) and rotates in synchronization with the axles 115. The transmission gear 160 is engaged with the teeth 152 of the annular gear 150 to form the engagement relationship between the annular gear 150 and the planet gear sub-system 102.

The multi-ratio transmission device 100 of the present invention further includes a central axle 174. The central axle 174 is disposed coaxially with the first axis 104, and is inserted to a center through hole 176 of the hollowed tube 132 of the setting element controller 130 by relative rotation. The central axle 174 enables the hollowed tube 132 to rotate around the central axle 174, so when the rotation controller 133 rotates the hollowed tube 132 of the setting element controller 130 around the central axle 174, the setting element 124 moves in the axial direction on the outer circumferential surface 134 of the hollowed tube 132.

The two ends of the central axle 174 are secured to the vehicle frame 3 respectively, so the central axle 174 is mounted to the vehicle frame 3 and is prevented from relative motion or rotation. Two flat surfaces 178 are formed opposite to each other at each end of the central axle 174. The flat surfaces 178 can engage with the external flat surfaces to prevent the rotation of the central axle 174. In addition, the flat surfaces 178 also provide the space for other components to mount onto the central axle 174.

In the embodiments of the present invention, the multi-ratio transmission device 100 further includes a one-way clutch 200. The one-way clutch 200 is installed onto the cylindrical casing 154 and is located outside of the first planet gear sub-system 102. The one-way clutch 200 includes a clutch casing 202 and multiple pin sets 204. The clutch casing 202 is roughly a cylindrical component having an inner axial end (not numbered) and an outer axial end (not numbered). The inner axial end is inserted into the cylindrical casing 154, and the outer axial end is located outside the cylindrical casing 154. The cylindrical component of the clutch casing 202 has a side circumferential surface (not numbered). The outer diameter of the side circumferential surface is roughly equal to the inner diameter of the cylindrical casing 154, so that the clutch casing 202 can be inserted into the cylindrical casing 154. In addition, an outer thread 206 is formed on the side circumferential surface for engaging with the inner thread formed on the inner circumferential surface of the cylindrical casing 154. In this way, the one-way clutch 200 can be installed inside the cylindrical casing 154. The inner thread formed on the inner circumferential surface of the cylindrical casing 154 for securing the clutch casing 202 can be formed together with the inner thread 158 for securing the annular gear 150, as shown in the figures illustrating the multi-ratio transmission device 100. Alternatively, the two inner threads can also be formed separately.

A through hole 208 is formed at the center of the clutch casing 202, and is configured to be coaxial with the first axis 104. The rotation controller 133 of the setting element controller 130 is rotatably fitted and supported in the through hole 208. The cross-section shape of the through hole 208 is formed corresponding to the rotation controller 133 and the shape of the hollowed tube 132 installed on the rotation controller 133. This belongs to the common means of those who skilled in the art, therefore it is not described in detail herein. A fact worth mentioning is that, a bearing 210 or other components with similar functions is disposed between the rotation controller 133 and the through hole 208 for steadily and rotatably supporting the rotation controller 133 of the setting element controller 130 and the hollowed tube 132.

An annular protrusion 212 is formed on the outer axial end of the clutch casing 202, and is formed coaxially with and surrounding the through hole 208 for coaxially supporting a sprocket 214. Multiple pin-fitting holes 216 are formed on the annular protrusion 212. In the embodiments, six pin-fitting holes 216 are formed on the annular protrusions 212, but the number of the pin-fitting holes 216 can be adjusted according to different needs. Preferably, the pin-fitting holes 216 are formed on the annular protrusion 212 in the circumferential direction with the same angular interval between every two adjacent pin-fitting holes 216. Each pin-fitting hole 216 is formed with a first section 218 and a second section 220, in which the first section 218 has a larger diameter than the second section 220. A shoulder portion 222 is formed between the first section 218 and the second section 220. A pin set 204 is fitted inside each pin-fitting hole 216.

Each pin set 204 includes a housing 224 which is shaped as a hollowed cylinder and a pin 226 which is movably placed inside the housing 224. A spring 228 is placed between the housing 224 and the pin 226 in such a manner that its inner end abuts against the shoulder portion 222 and its outer end abuts against a flange of the pin 226. With the flexibility of the spring 228, the spring 228 pushes the outer end 230 of the pin 226 outside the housing 224, and further engages the outer end 230 of the pin 226 with the engaging holes 232 formed on the first sprocket 214. In this way, the one-way clutch 200 engages with the first sprocket 214 to rotate together with the first sprocket 214.

With the flexibility of the spring 228, the pin 226 retracts back into the casing 224 when the outer end 230 of the pin 226 is under internal stress. Under this condition, the inner end of the pin 226 is fitted inside the second section 220 of the pin-fitting hole 216 of the housing 224, thereby avoiding interferences between the components.

Multiple engaging holes 232 are formed on the first sprockets 214. The engaging holes 232 are distributed along a circle, which is coaxial with the first axis 104, with equal angular intervals between every two adjacent engaging holes 232. Each engaging hole 232 has a front end and a back end (both not numbered) in the circumferential direction. The back end has a flat surface, which abuts against the outer end 230 of the pin 226, for transmitting the force. When the first sprocket 214 rotates forward, the back ends of the engaging holes 232 also rotate forward with the pins 226, thereby transmitting the torque and the rotation motion to the multi-ratio transmission device 100 of the present invention. On the other hand, the front end of the engaging hole 232 is an oblique surface, which serves as a cam. The front end of the engaging hole 232 can guide the outer end 230 of the pin 226 to the outside of the engaging hole 232 when it comes into contact with the outer end 230 of the pin 226. Hence, when the first sprockets 214 rotates backward, the pin 226 would not transmit the torque and the rotation motion to the multi-ratio transmission device 100 of the present invention due to the oblique surface of the front end of the engaging hole 232. In this way, the one-way clutch 200 is only able to transmit the torque and rotation motion in one direction.

Figure 8:
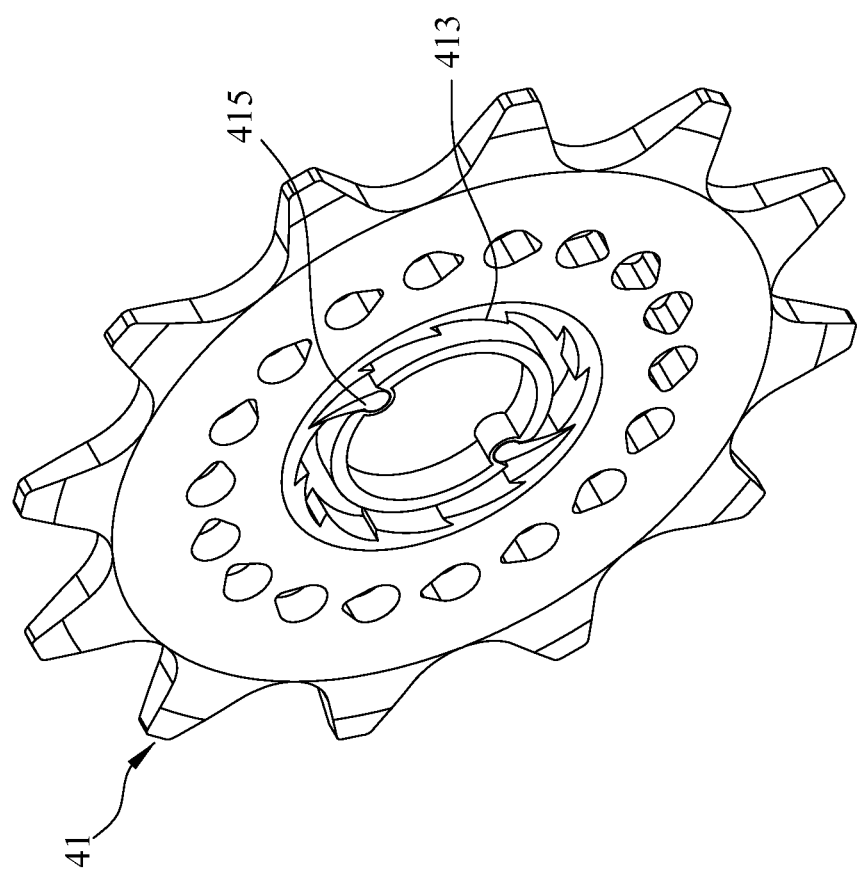
FIG. 8 is a partial enlarged view of a second sprocket shown in FIG. 3.

In addition, the one-way clutch 200 can also be disposed separately from the multi-ratio transmission device 100. As shown in FIG. 3 and FIG. 8, in the situation where the one-way clutch 200 and the multi-ratio transmission device 100 are disposed separately, a ratchet wheel 413 is disposed integrally on the second sprocket 41, and a pawl 415 is disposed on the wheel axle of the rear wheel 302 for engaging with the ratchet wheel 413. Consequently, the structure of the multi-ratio transmission device 100 can be simplified, the function of the multi-ratio transmission device is clearer and the maintenance and detaching process thereof also becomes easier.

In the embodiments of the present invention, the multi-ratio transmission device 100 further includes a shift cable connector 234. The shift cable connector has an inner axial pin 236 for inserting into and connecting with a connecting hole 238 of the rotation controller 133 of the setting element controller 130. The connecting hole 238 is formed eccentrically to the first axis 104, in this way, the shift cable connector 234 can rotate the connecting hole 238 around the first axis 104, and further drives the hollowed tube 132 of the rotation controller 133 to rotate around the first axis 104, thereby shifting between different gear ratios.

A shift cable (not shown) can be installed onto the shift cable connector 234. The shift cable can be the shift cable commonly seen on any bicycles, which is connected with the shift lever 314 installed on the bicycle. When the user pulls the shift lever 314, the shift cable is then pulled by the shift lever 314 and further rotates the setting element controller 130 through the shift cable connector 234.

In addition, an outer axial pin 240 is disposed on the shift cable connector 234 opposite to the inner axial pin 236.

A shift-guiding component 242 is inserted and connected to the central axle 174. Especially, an insertion hole 244 is formed at the center of the shift-guiding component 242, in which the two sides of the insertion hole 244 are formed as two flat walls 246 for abutting against the flat surfaces 178 of the central axle 174, so as to prevent relative rotation between the two. In addition, a circular guiding groove 248 is formed coaxially with the first axis 104 on the shift-guiding component 242. The circular guiding groove 248 extends in a range of angles along the circumferential direction, in which the range of angles is corresponded to the range of predetermined angles for the rotation of the hollowed tube 132 of the setting element controller 130.

The outer axial pin 240 of the shift cable connector 234 is inserted into the circular guiding groove 248 to move along the circular guiding groove 248. When the user pulls the shift cable connector 234 through the shift cable, the outer axial pin 240 moves along the circular guiding groove 248, thereby achieving the shifting between different gear ratios. Herein, a fact worth mentioning is that the two ends of the circular guiding groove 248 serve as the stopper of the outer axial pin 240 to prevent the outer axial pin 240 from moving out of range.

A restoring spring 250 is disposed between the shift-guiding component 242 and the rotation controller 133 of the setting element controller 130. The restoring spring 250 provides the restoring force of the setting element controller 130 after the gear shifting, in which the setting element controller 130 is pulled by the shift cable. In the embodiments, the restoring spring 250 has two side ends 252, which are inserted into the insertion hole 254 formed on the rotation controller 133 and the insertion hole 256 formed on the shift-guiding component 242 respectively.

The above description regarding the multi-ratio transmission device 100 serves as the illustration purpose only. One skilled in the art could make modification or changes to the multi-ratio transmission device 100 without departing from the scope of the present invention. According to the appended claim of the present invention, all the multi-ratio transmission device that can achieve the same effect, and can be installed inside input tubular member 35 is considered to be within the scope of the present invention.

Figure 9A:
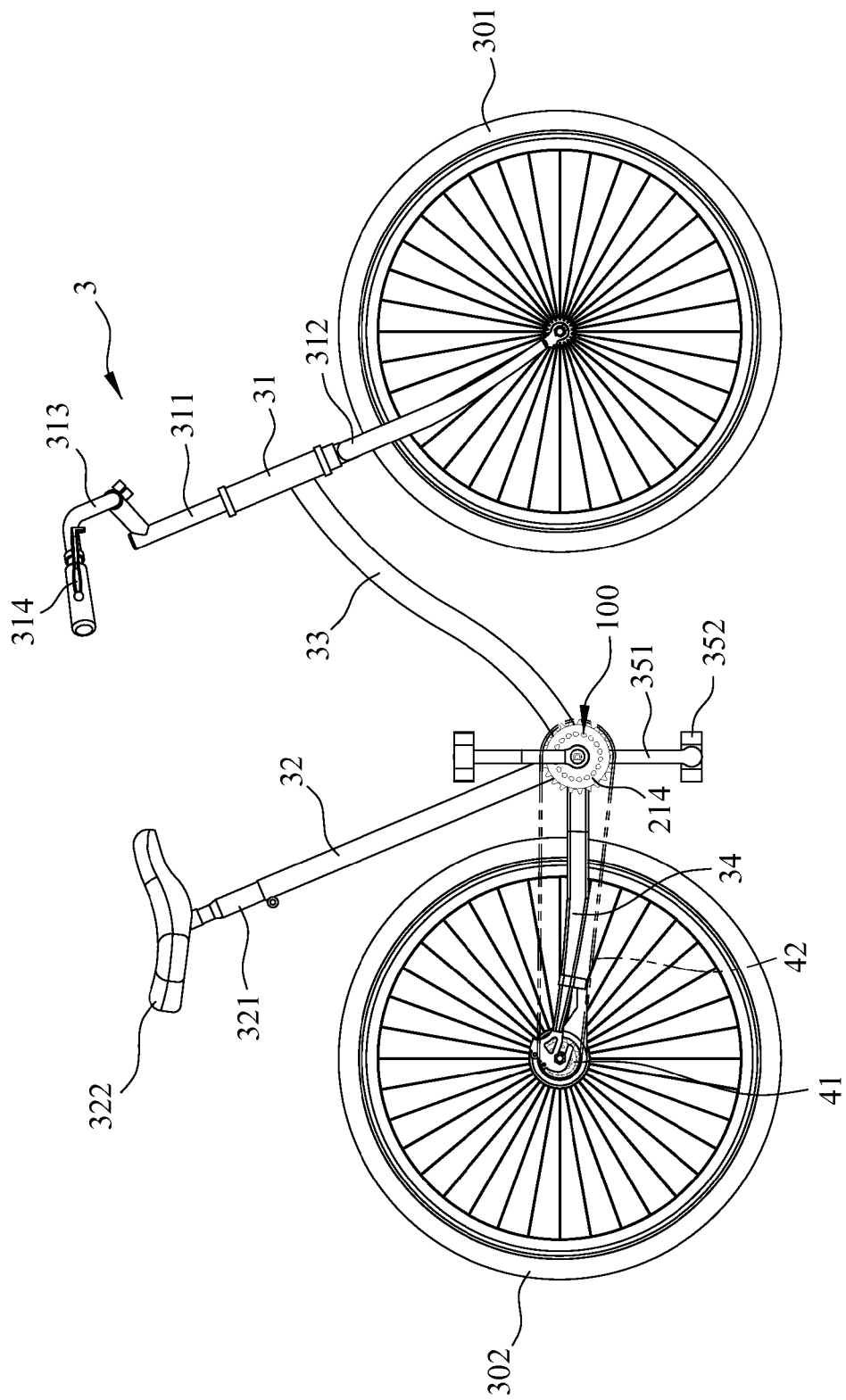
FIG. 9A is a side view showing a two-wheel vehicle structure according to a first variation of the present invention.
Figure 9B:
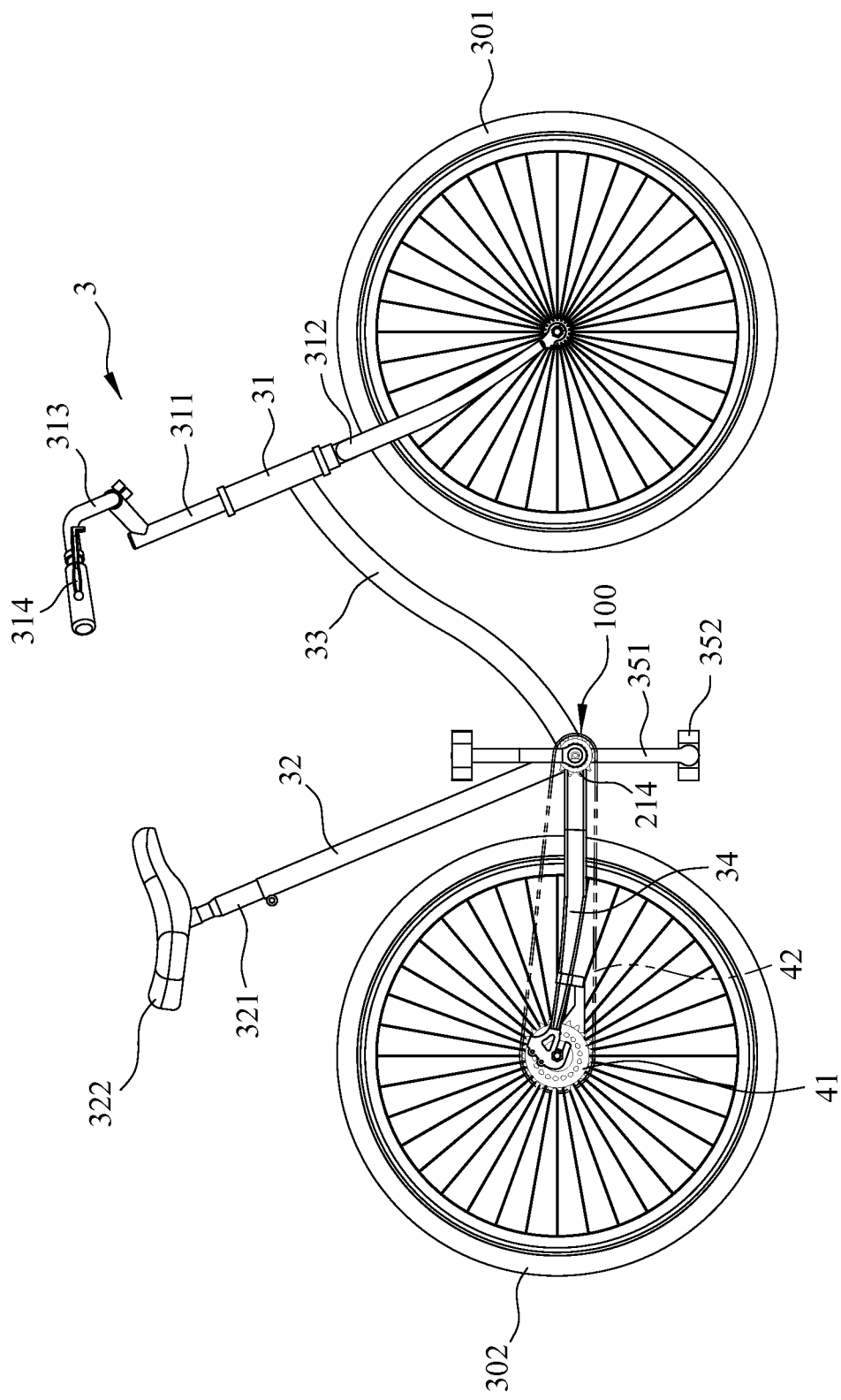
FIG. 9B is a side view showing a two-wheel vehicle structure according to a second variation of the present invention.

In the following section, two variations of the present invention will be explained with reference to FIG. 9A and FIG. 9B. FIG. 9A and FIG. 9B are side views showing the variations of the two-wheel vehicle structure of the present invention. In the variations of the present invention, the configuration of the two-wheel vehicle structure can be any one of the configurations from the first embodiment or the second embodiment.

As shown in FIG. 9A, in the first variation of the present invention, the gear ratio of the first sprocket 214 to the second sprocket 41 is greater than 1. With such configuration, in addition to the speed changing effect provided by the multi-ratio transmission device 100, speed can be further changed by the gear ratio between the first sprocket 214 and the second sprocket 41. More specifically, in the configuration of the first embodiment, given that the gear ratio of the multi-ratio transmission device 100 is set to N:1 and the gear ratio between the first sprocket 214 and the second sprocket 41 is set to n:1, when the cranks 351 are rotated for one revolution, the second sprocket 41 is rotated for N*n revolutions. Namely, when the rider rotates the cranks 351 for one revolution, the vehicle can move further in the configuration of the first variation comparing with the configuration of the first embodiment in the present invention. Similarly, in the configuration of the second embodiment, although the multi-ratio transmission device 100 does not affect the moving distance of the vehicle, but the two-wheel vehicle could move further with the configuration of the first variation. Precisely, by setting the gear ratio between the first sprocket 214 and the second sprocket 41 as n:1, the second sprocket 41 can rotate for n revolutions when the cranks 351 rotate for one revolution. In other words, comparing with the configuration in the second embodiment, the present variation allows the rider to operate with less effort while granting a longer moving distance of the vehicle.

As shown in FIG. 9B, in the second variation of the present invention, a gear ratio of the first sprocket 214 to the second sprocket 41 is less than one. With such configuration, besides from the speed changing effect provided by the multi-ratio transmission device 100, additional speed changing effect can be received from the gear ratio between the first sprocket 214 and the second sprocket 41. Specifically, in the configuration of the first embodiment, given that the gear ratio of the multi-ratio transmission device 100 is 1:N and the gear ratio between the first sprocket 214 and the second sprocket 41 is 1:n, the second sprocket rotate for 1/(N*n) revolution when the cranks rotate for one revolution. Namely, the rider can ride the two-wheel vehicle to climb ramps with less effort. Similarly, when applying the second variation to the second embodiment, that is, by setting the gear ratio between the first sprocket 214 and the second sprocket 41 as 1:n, the second sprocket 41 rotates for 1/n revolution when the cranks 351 rotate for one revolution. In other words, when applying the second variation to the second embodiment, the rider can operate the vehicle with less effort while climbing ramps easily.

Although the present invention has been described with reference to the preferred embodiments thereof, it is apparent to those skilled in the art that a variety of modifications and changes may be made without departing from the scope of the present invention which is intended to be defined by the appended claims. Any equivalent structures in the same field or other related fields achieved with the description and figures of the present invention should be considered within the scope of protection of the present invention.

What is claimed is:

1. A two-wheel vehicle structure, comprising:
a vehicle frame equipped with a handle and two wheels, wherein at least one of the wheels is a driving wheel, the vehicle frame comprising:
an input tubular member wherein a crank is attached at each end of the input tubular member, and a pedal is attached on each said crank; and
a multi-ratio transmission system, comprising:
a multi-ratio transmission device comprising:
a first sprocket, installed inside the input tubular member and located at a rotation center of the cranks, wherein the first sprocket is located at an outer side of the input tubular member and is located between the input tubular member and one of the cranks, wherein the multi-ratio transmission device is connected to a shift lever, which is installed on the handle, with a shift cable;
a plurality of planet gear sub-systems being coaxially disposed in series along a first axis, each of said planet gear sub-system comprising:
a sun gear, being coaxially disposed along said first axis, wherein said sun gear rotates around said first axis optionally; and
at least one planet gear being coaxially disposed along a second axis which is vertical to said first axis, wherein said at least one planet gear rotates around said second axis;
a coupling assembly disposed between every two adjacent said planet gear sub-systems so as to transmit rotation of said planet gear of the former said planet gear sub-system to said planet gear of the latter said planet gear sub-system;
a setting element disposed corresponding to each of said planet gear sub-systems, wherein said setting element optionally moves in the direction of said first axis so as to optionally engage with said sun gear of said planet gear sub-system;
a setting element controller having a hollowed tube disposed coaxially with said first axis to rotate around said first axis within a range of predetermined angles, wherein said hollowed tube has an outer circumferential surface, and a cam groove is formed on said outer circumferential surface in the circumferential direction corresponding to each of said setting element of said planet gear sub-system, thereby allowing said setting element to optionally move along said first axis and to optionally engage with said sun gears of said planet gear sub-systems;
an annular gear engaged to said planet gear of at least one planet gear sub-system;
a cylindrical casing enclosing said planet gear sub-systems, wherein an outer diameter of the cylindrical casing is smaller than an inner diameter of the input tubular member, so the cylindrical casing can be installed inside the input tubular member; and
a central axle being disposed coaxially with said first axis, wherein said central axle is inserted into a center through hole of said hollowed tube of said setting element controller by relative rotation, thereby enabling said hollowed tube to rotate around said central axle;
a second sprocket coaxially installed on a wheel axle of the driving wheel, and located on a same side of the vehicle frame with the first sprocket, wherein a ratchet wheel is disposed on the second sprocket, a pawl is disposed on the wheel axel of the driving wheel for engaging the ratchet wheel; and
a chain winded around and engaged with the first sprocket and the second sprocket;
wherein when the cranks rotate, the rotation motion of the cranks are transmitted to the first sprocket through the multi-ratio transmission device, subsequently, the motion is transmitted to the second sprocket from the first sprocket through the chain, thereby propelling the driving wheel to rotate, and
wherein the first sprocket is installed onto said planet gear sub-systems through a one-way clutch, so the planet gear sub-systems can be driven to rotate by the rotation of the cranks.

2. The two-wheel vehicle structure according to claim 1, wherein the shift cable is connected to the multi-ratio transmission device inside the input tubular member through an inside of the vehicle frame.

3. The two-wheel vehicle structure according to claim 1, wherein a gear ratio between the first sprocket and the second sprocket is 1:1.

4. The two-wheel vehicle structure according to claim 1, wherein a gear ratio of the first sprocket to the second sprocket is larger than 1.

5. The two-wheel vehicle structure according to claim 1, wherein a gear ratio of the first sprocket to the second sprocket is less than 1.

* * * * *